United States Patent Office 3,801,701
Patented Apr. 2, 1974

3,801,701
PROCESS FOR THE REDUCTION OF
URANYL SALTS
Robert George Robins, Chatswood, and Barry William Edenborough, Kingsford, New South Wales, Australia, assignors to Unisearch Limited, Kensington, New South Wales, Australia
No Drawing. Filed May 18, 1970, Ser. No. 38,579
Claims priority, application Australia, May 20, 1969, 55,280/69
Int. Cl. C01g 43/02
U.S. Cl. 423—261                  8 Claims

ABSTRACT OF THE DISCLOSURE

An improved process for the production of uranium dioxide by the reduction of an acid solution of a uranyl salt, preferably the sulphate, nitrate, chloride, acetate or perchlorate, or a mixture of any of these salts, with a carbohydrate, such as sucrose, D-glucose, D-fructose, starch or a saccharide, at a temperature of between 60° C. and 300° C. until the uranyl solution is reduced to uranium dioxide.

---

The present invention relates to an improved process for the production of uranium dioxide and more particularly to a process for the preparation of uranium dioxide by reduction of acid uranyl salt solutions with a carbohydrate as the reducing agent.

Conventional processes for the production of uranium dioxide involve such steps as first precipitating "ammonium di-uranate" or a uranium trioxide hydrate from acid uranyl sulphate or uranyl nitrate solution, filtering washing and drying the "ammonium di-uranate," heating to about 800° C. and finally reducing the resulting oxide ($U_3O_8$) with hydrogen gas at about 700° C. to yield a brown colored uranium dioxide powder.

The properties of the powder from the conventional process can be controlled over a wide range of particle size and reactivity and can be evaluated in one sense by the ability to press and sinter into pellets of close to theoretical density. The conventional process consists of five main steps (a) precipitation (b) filtration and washing (c) drying (d) decomposition at 200° C. (e) reduction at 700° C.

A number of processes have been developed for the direct production of uranium dioxide in aqueous media however these processes have suffered from the disadvantage that they are comparatively slow reactions and have to be carried out at temperatures mostly above 200° C. and at high pressures and usually in the presence of catalyst. One such process has involved the reduction of alkaline aqueous suspensions of uranyl carbonate with hydrogen gas at pressures of about 100 to 500 p.s.i. and temperatures of about 200° C. in the presence of metal catalysts and organic promotors. Another similar method involves the use of formaldehyde sulphoxylate reducing agent in alkaline uranyl carbonate solutions at about 200° C.

Yet another similar method involves the reduction of acid uranyl nitrate solutions with hydrogen gas at pressures above 1000 p.s.i. and temperatures above 200° C.

All of these aqueous processes involve temperatures considerably above 100° C. and pressures hundreds of pounds per square inch above atmospheric pressure. The reaction time for these processes is several hours.

The present invention is designed to overcome the disadvantages associated with the known processes by providing an efficient, relatively cheap process for the production of uranium dioxide, which enables uranium dioxide to be produced rapidly under relatively mild conditions.

The present invention consists in a process for the production of uranium dioxide by reducing an acid solution of an uranyl salt with a carbohydrate at a temperature betwee 60° C. and 300° C. until the uranyl solution is reduced to uranium dioxide.

The advantages of the present invention lie in its relatively few steps together with lower temperatures and pressures in general, very much shorter reaction time, the possibility of not using catalyst, and low cost of the reducing agent.

It is preferred to use freely soluble uranyl salts such as uranyl sulphate, uranyl nitrate, uranyl chloride, uranyl acetate or uranyl perchlorate or mixtures of these salts. When dissolved in water these salts produce an acid solution. It is however sometimes necessary to further acidify the solution to prevent the precipitation of a carbonaceous uranium (VI) compound or urano-uranic oxide ($U_3O_8$) from the solution during the process. The limiting pH value which may be used depends upon the other reaction conditions and may be readily determined by experimentation. Additional acid may be particularly necessary if uranyl nitrate is used as the starting material and if temperatures above about 100° C. are used. Under these conditions the nitrate ion reduction occurs and results in an increase in the solution pH. As a result, a tendency exists for either carbonaceous uranium (VI) compounds or urano-uranic oxide precipitate.

The acid may be any water soluble acid which is capable of dissociating sufficiently to reduce the pH of the solution to a satisfactory level. It is preferred to use sulphuric acid, nitric acid or hydrochloric acid. In some instances a mixture of various acids is preferred.

In the case of uranyl nitrate solutions at temperatures below about 100° C. and other uranyl salt solutions at all temperatures in the range of the process, it is sometimes desirable to add an alkali to the starting solution or to add an alkali to the uranyl salt solution during the reaction either stepwise or continuously. The alkali neutralizes the acid produced in the reaction and has a beneficial effect on the rate of reaction. It also avoids the coprecipitation of hydrated uranium (IV) sulphate materials from sulphate solutions and is useful in controlling the characteristics of the uranium dioxide produced.

The alkali may be any water soluble alkali. It is preferred to use an ammonium hydroxide solution.

The uranyl salts used in the present invention may be in the form of a single pure salt or a mixture of pure salts. Intermediates in the production of such salts may also be used. Pure solutions obtained by solvent extraction or ion exchange of uranium ore leach liquors may be used directly in the present invention. Yellow cake produced during the conventional uranium ore refining process may also be used, this yellow cake essentially comprises hydrated uranium trioxide which can be dissolved in acid to provide a suitable solution. Yellow cake which is purified by dissolution in carbonate solutions, filtered and reprecipitated, may also be used. The process is also applicable to crude uranium ore leach liquor solutions and to radioactive solutions including solutions obtained by the dissolution of spent fuel elements.

Depending upon the processing conditions as herein specified, uranium is preferentially precipitated as uranium dioxide from crude uranium ore leach liquor solutions. Non uranium salts and materials remain dissolved in the solution.

Among the most suitable carbohydrate reducing agents are mono-, tri-, tetra-, and poly-saccharides either in the form of a raw material, an intermediate product or the pure refined carbohydrate. Starch, sucrose, glucose and cellulose have been found to be particularly effective in carrying out the present invention. By comparison with the carbohydrates, the other organic reducing agents specified herein as suitable for the process, give generally slower rates of reaction.

The reducing agent should be present in at least a stoichiometric amount in order to reduce all the uranyl salt. It is preferable to add a stoichiometric excess of reducing agent due to the side reactions which are likely to consume the reducing agent. As the reducing agent is very cheap compared with the cost of the uranyl salts it is possible to add the reducing agent in excess without rendering the reaction uneconomic.

The reaction temperature may vary between 60° C. and 300° C. A temperature of between 100° C. and 230° C. has been found convenient and effective.

The reaction is carried out efficiently batchwise, in a sealed container. An air atmosphere may be used but it is an advantage in some instances to provide a less oxidizing atmosphere by carrying out the process in the presence of an inert gas such as carbon dioxide, nitrogen or argon. An alternative method of providing a less oxidizing atmosphere is to bleed some of the steam from the reactor at an early stage in the process in order to sweep out the initially contained air.

The reactor may be constructed of or lined with a suitable material which does not result in undesirable product contamination due to the corrosive effects of the solution. Agitation is an advantage during the reaction but is not essential.

The reducing agent may be added to the reactor containing the uranyl salt solution at temperature. However, it is preferable for it to be added prior to heating. A heating rate in the range 0.5 to 30 centigrade degrees per minute is suitable although a rate of 2 to 4 centigrade degrees per minute is preferable.

If the uranyl salt or uranyl salts comprise uranyl nitrate, the nitrate may be partially reduced before the uranyl ion reduction occurs. Under these conditions sufficient reducing agent must be provided for the nitrate reduction and for the complete uranium reduction to uranium dioxide. The nitrate reduction is an exothermic reaction which occurs rapidly under favorable conditions. As a result of the exotherm, an increase in the temperature of the solution occurs which favors the uranium reduction. A simultaneous increase in the solution pH, due to the nitrate ion reduction and the production of extremely reducing carbohydrate degradation products favor the uranium reduction. It follows that in reducing uranyl salt solutions other than uranyl nitrate solutions, it is an advantage to add nitrate to the solution either in the form of nitric acid or a readily soluble nitrate salt.

Gaseous products of the reaction such as carbon dioxide and oxides of nitrogen may be vented from the reactor during the reaction in order to avoid an undesirable increase in pressure inside the reactor and in order to enable the reaction to be carried out in relatively low pressure apparatus. Gas release valves of known design are suitable for this purpose.

The gaseous products may be redissolved directly in the initial uranyl salt solution in order to effect acidification. Alternatively they may be dissolved in water by known procedures to produce acid solutions.

The reaction time depends upon the reducing agent, reaction temperature, concentration of uranium, free acid or alkali, nitrate and reducing agent in the solution, agitation, heating procedure, method of adding the reducing agent to the solution and the quantity and type of catalyst if any. The reaction time can be as short as a few minutes, even without a catalyst, provided suitable reactions conditions are used. Such reaction times are possible with maximum reaction temperatures considerably below 200° C.

In instances in which it is desirable to operate at temperatures of the order to 200° C., with nitrate solutions, it is usually only necessary to heat the reactor to a temperature of about 130° C. and to conserve the exotherm which is associated with the nitrate reduction, by suitable design of the apparatus.

The process may be carried out, alternatively, in a continuous tubular reactor. Depending upon the size of the reactor and the processing conditions, suitable flow rates can be determined by experimentation to achieve a desired yield.

The properties of the uranium dioxide produced by the present process can be controlled by choice of the processing conditions including those which have previously been referred to in connection with their effect upon reaction rate. The uranium dioxide product is non pyrophoric and its stoichiometry and surface and particle characteristics can be controlled to enable it to be pressed and sintered into pellets having close to theoretical density.

Uranium dioxide prepared with carbohydrates as reducing agents are susceptible to carbon contamination, since the carbohydrates tend to undergo browning reactions during the process.

The extent to which uranium dioxide materials are susceptible to carbon contamination when produced by reduction with carbohydrates, is dependent upon the particular carbohydrate employed. It has been found that starch is considerably less susceptible to browning reactions than D-glucose and sucrose particularly under the conditions of the process. Therefore carbon contamination of the uranium dioxide product is less when starch is used as the reducing agent than when either D-glucose or sucrose are used. Similarly, D-glucose is less susceptible to browning than sucrose under the particular conditions and results in less carbon contamination of the product than sucrose.

The extent to which browning reactions take place and the consequent extent of the carbon contamination of the uranium dioxide product is also dependent upon the reaction temperature, uranium, nitrate and reducing agent concentrations in the solution, the solution pH, heating rate, whether the reducing agent is added to the solution prior to heating or at temperature, and the rate of addition of the reducing agent to the solution.

By a suitable choice of the processing conditions, it is possible to produce a uranium dioxide product in which the carbon content is less than 0.01 percent on a weight basis.

An additional way of achieving a low carbon content in the uranium dioxide product involves the addition of a compound to the solution which complexes in some way with the uranium ions in the solution. This reduces the extent to which the uranium complexes with the reducing agent or fragments of the reducing agent which form as a result of its decomposition during the process. Avoidance of the formation of these complexes is important with regard to the elimination of browning reactions during the process. Known compounds which complex uranium are suitable such as nitric acid, acetic acid and sulphuric acid. The presence of known browning inhibitors such as sodium sulphate, sodium bisulphite and ferric chloride is also useful in reducing the carbon content of the uranium dioxide product.

The uranium dioxide prepared according to the present invention may be separated from the reaction medium by filtration and washing or by other known separation procedures.

It is an advantage in some instances to carry out the separation and washing at temperatures near to the boiling point of approximately 100° C. in order to avoid the precipitation of a carbonaceous uranium (VI) compound in the solution on recooling, to ambient temperatures. This may form if some unreduced uranium is present in the solution and if some incompletely oxidized carbohydrate or carbohydrate decomposition fragments are present in the solution.

For particular applications, it may be necessary to dry the uranium dioxide product. Due to the oxidation stability of the uranium dioxide, it would usually be possible to carry out the drying at temperatures up to 200° C. in air. Heating to temperatures in the range 200° C. to 800°

C. in the presence of a hydrogen nitrogen, carbon dioxide or argon gaseous atmosphere is beneficial in reducing the carbon, nitrate, chloride and sulphate content of the material.

The invention is best described by the following examples. These examples are presented merely for purposes of illustration and are not intended in any way to limit the scope of the invention nor the manner in which it can be practiced.

In Examples 1, 2, 4, 5 and 6 the experiments are performed in a standard, commercially available Autoclave Engineers reactor, catalogue number ABE 1005. The reactor is one liter in capacity, constructed of 316 stainless steel and equipped with an impeller type agitator.

In Example 2 the experiment is performed in a standard, commercially available Parr reactor, catalogue number 4500. The reactor is one liter in capacity, constructed of Hastelloy B, internally lined or coated with Teflon and equipped with an impeller type agitator.

A glass liner is used in each reactor in order to avoid minute contamination of the uranium dioxide product by materials which form as a result of the corrosion of the reactor. The reactions are carried out in the presence of an inert argon atmosphere.

EXAMPLE I

Into the one liter Autoclave Engineers reactor described above there is placed 50 milliliters of a solution containing 98.5 grams of uranyl nitrate and 30 grams of sucrose. Thhe autoclave is closed and with a stirrer speed of 480 r.p.m. it is heated at a rate of four centigrated degrees per minute. Nitrate ion reduction begins at a temperature of about 130° C. resulting in a fast temperature rise to 170° C. Oxides of nitrogen and carbon dioxide gases are evolved which cause an increase in pressure if they are not vented from the reactor. Towards the end of the fast temperature increase the uranium reduction begins and it is complete within five minutes. The uranium dioxide material produced under these conditions is composed of some three percent carbon on a weight basis. The carbon content of the material is considerably decreased by heating the material in a hydrogen atmosphere to a temperature of 650° C. for two hours.

EXAMPLE 2

To illustrate the critical effect of temperature in the process of this invention two experiments are performed using the procedure of Experiment 1. In one, 500 milliliters of a solution containing 98.5 grams of uranyl nitrate and 50 grams of sucrose are heated to a temperature of 82° C. and maintained at that temperature for 84 hours. A slow reduction results in the conversion of some sixty percent of the uranium to uranium dioxide during the time interval.

In the second experiment 500 milliliters of a solution containing 98.5 grams of uranyl nitrate and 50 grams of sucrose are heated to a temperature of 90° C. and maintained at that temperature. An ammonium hydroxide solution is added to the reactor stepwise during the process in order to maintain a solution pH as near as possible to 2.7. A decrease in pH occurs otherwise since the uranium reduction rate is more rapid than the nitrate reduction rate under the conditions. Processing for 42 hours is required in order to achieve ninety five percent reduction of the uranium in solution to uranium dioxide.

EXAMPLE 3

The advantage of the presence of nitrate in the solution is seen by comparing this example with Example 1. Into the one liter Parr reactor there is placed 500 milliliters of a solution containing 83.5 grams of uranyl sulphate and 40 grams of sucrose. The autoclave is closed and with a stirrer speed of 200 r.p.m. it is heated at a rate of approximately four centigrade degrees per minute to a temperature of 190° C. The temperature is maintained for ten hours after which time some seventy eight percent of the uranium is reduced to uranium dioxide. An increase in the stirrer speed to 600 r.p.m. is shown to have negligible effect on the rate of reduction. It appears that the presence of nitrate and in particular in the reduction of the nitrate by sucrose results in the formation of sucrose fragments which are very reducing.

EXAMPLE 4

Into the one liter autoclave engineers reactor described above, there is placed 500 milliliters of a solution containing 50.1 grams of uranyl nitrate, 48.3 milliliters of 15 normal nitric acid, 1.1 milliliters of 36 normal sulphuric acid and 34.8 grams of starch. The autoclave is closed and heated at a rate of three centigrade degrees per minute without agitation. Nitrate ion reduction begins at a temperature of about 130° C. whereupon sirring is commenced at a speed of 480 r.p.m.

The associated exotherm results in a fast temperature rise to 210° C. Oxides of nitrogen and carbon dioxide gases are evolved which cause an increase in pressure if they are not vented from the reactor. Towards the end of the fast temperature increase the uranium reduction begins and it is complete within forty five minutes. The uranium dioxide material produced under these conditions is composed of less than 0.1 percent carbon by weight. The carbon content of the material is reduced by heating the product in a hydrogen atmosphere at a temperature of 650° C. for two hours.

EXAMPLE 5

Into the one liter autoclave engineers reactor there is placed 500 milliliters of a synthetic uranium ore leach liquor solution containing the following pure grade chemicals:

|   | Gms. |
|---|---|
| Uranyl sulphate | 43.0 |
| Magnesium hydroxide | 0.17 |
| Calcium oxide | 0.01 |
| Sodium hydroxide | 0.04 |
| Ferric oxalate | 0.26 |
| Manganese sulphate | 0.07 |
| Copper sulphate | 0.03 |

The solution also contains 56.0 milliliters of 15 normal nitric acid and 31.9 grams of starch. The autoclave is closed and heated at a rate of three centigrade degrees per minute without agitation. Nitrate ion reduction begins at a temperature of about 130° C. whereupon stirring is commenced at a speed of 480 r.p.m.

The associated exotherm results in a fast temperature rise to 208° C. Oxides of nitrogen and carbon dioxide gases are evolved which cause an increase in pressure if they are not vented from the reactor. Towards the end of the fast temperature increase the uranium reduction begins and it is complete within thirty five minutes. The uranium dioxide material produced under these conditions has the following analysis:

|   | P.p.m., U metal basis |
|---|---|
| Fe | 300 |
| Ni | 15 |
| Al | 10 |
| Mo | 0.5 |
| V | 3 |
| Cu | 50 |
| Na | 60 |
| Zn | 15 |
| Cr | 150 |
| Mg | 30 |
| Mn | 30 |
| B | 0.3 |
| Si | 100 |

C, 0.37% (by weight).

EXAMPLE 6

The superior reducing effect of carbohydrates by comparison with formaldehyde is seen in comparing previous examples with this example.

Into the one liter autoclave engineers reactor there is placed 500 milliliters of a solution containing 16.7 grams of uranyl sulphate and 125 milliliters of a 36% formaldehyde solution. The autoclave is closed and with a stirrer speed of 480 r.p.m. it is heated at a rate of four centigrade degrees per minute to a temperature of 220° C. and maintained at the temperature for ten hours. This results only in the reduction of some sixty percent of the uranium to uranium dioxide.

We claim:

1. A process for the production of uranium dioxide which comprises admixing an acid solution of a uranyl salt or uranyl salts with a carbohydrate selected from the group consisting of starch, sucrose and glucose and heating the liquid mixture thus obtained to a temperature of between 60 to 300° C., whereby said uranyl salt or salts are reduced to uranium dioxide.

2. The process of claim 1 in which the said uranyl salt is selected from the group consisting of uranyl sulphate, uranyl nitrate, uranyl chloride, uranyl acetate, uranyl perchlorate and mixtures thereof.

3. The process of claim 1 in which the uranyl salt is obtained by the dissolution of yellow cake in acid solution.

4. The process of claim 1 in which the uranyl salt is obtained by dissolution of yellow cake in a solution of a carbonate and bicarbonate salt, filtering the solution, precipitating the uranium as "ammonium diuranate" by the addition of ammonium hydroxide solution, washing of the precipitate and dissolution of the precipitate in acid solution.

5. The process of claim 4 in which said carbonate and bicarbonate salts are ammonium carbonate and ammonium bicarbonate.

6. The process of claim 1 in which the pH of the acid uranyl salt solution is rendered more acidic prior to and/or during the reduction by said carbohydrate by adding to the solution an acid selected from the group consisting of nitric acid, sulphuric acid, hydrochloric acid, acetic acid, formic acid, perchloric acid and mixtures thereof, thereby to prevent precipitation of uranium containing compounds.

7. The process of claim 1 in which the pH of the acidic uranyl salt solution is adjusted prior to and/or during the reduction by adding ammonium hydroxide to the solution to neutralize acid produced in the reaction and avoid coprecipitation of hydrated uranium (IV) sulfate materials from sulfate solutions.

8. The process of claim 1, wherein an effective amount of a browning suppressant selected from the group consisting of sodium sulphite, sodium bisulphite, ferric chloride, ammonium nitrate and sodium nitrate is added to the uranyl solution prior to and/or during the reduction.

References Cited

UNITED STATES PATENTS

| | | | |
|---|---|---|---|
| 3,006,859 | 10/1961 | Allemann et al. | 252—301.1 |
| 3,042,486 | 7/1962 | Forward et al. | 23—355 |
| 3,361,676 | 1/1968 | McBride et al. | 23—355 |
| 3,401,122 | 9/1968 | Cogliati et al. | 23—355 |

OTHER REFERENCES

Nuclear Science Abstracts, vol. 15, #7, abstract #7388.

CARL D. QUARFORTH, Primary Examiner

F. M. GITTES, Assistant Examiner

U.S. Cl. X.R.

252—301.1 R; 423—10, 15, 18, 20